United States Patent
Lewis et al.

(10) Patent No.: US 10,495,491 B2
(45) Date of Patent: Dec. 3, 2019

(54) DISTRIBUTED FIBRE OPTIC SENSING

(71) Applicant: OPTASENSE HOLDINGS LIMITED, Farnborough, Hampshire (GB)

(72) Inventors: Andrew Lewis, Farnborough (GB); Stuart Russell, Farnborough (GB)

(73) Assignee: OPTASENSE HOLDINGS LIMITED (GB)

( * ) Notice: Subject to any disclaimer, the term of this patent is extended or adjusted under 35 U.S.C. 154(b) by 89 days.

(21) Appl. No.: 15/756,258

(22) PCT Filed: Aug. 31, 2016

(86) PCT No.: PCT/GB2016/052696
§ 371 (c)(1),
(2) Date: Feb. 28, 2018

(87) PCT Pub. No.: WO2017/037453
PCT Pub. Date: Mar. 9, 2017

(65) Prior Publication Data
US 2019/0025094 A1    Jan. 24, 2019

(30) Foreign Application Priority Data
Sep. 1, 2015   (GB) .................................. 1515505.4

(51) Int. Cl.
*G01D 5/353*    (2006.01)
*G01H 9/00*     (2006.01)

(52) U.S. Cl.
CPC ......... *G01D 5/35361* (2013.01); *G01H 9/004* (2013.01)

(58) Field of Classification Search
CPC ...... G01D 5/353; G01D 5/35361; G01H 9/00; G01H 9/004
See application file for complete search history.

(56) References Cited

FOREIGN PATENT DOCUMENTS

| WO | WO 87/07014 | 11/1987 | |
| WO | WO-8707014 A2 * | 11/1987 | ......... G01D 5/35383 |
| WO | WO 2015/112116 | 7/2015 | |

* cited by examiner

*Primary Examiner* — Jamil Ahmed
(74) *Attorney, Agent, or Firm* — McDonnell Boehnen Hulbert & Berghoff LLP

(57) ABSTRACT

This application relates to methods and apparatus for distributed fibre optic sensing, especially distributed acoustic sensing (DAS). The sensor apparatus (300) has an optical generator (303, 305, 306) for repeatedly generating a first coded sequence of optical radiation to be launched into a sensing optical fibre (302). The first coded sequence is encoded according to a polylevel coding sequence (101) and has desired autocorrelation properties. A detector (311) detects optical radiation which has been Rayleigh backscattered from within the sensing optical fibre and a processor (301c) processes the output of the detector. The processor processes the detector output in range bins and for each range bin correlating a detection signal derived from the detector output with the polylevel coding sequence at a time delay corresponding to that particular range bin. This provides a measurement signal indicative of environmental disturbances, such as incident acoustic/seismic signals, acting on a portion of the sensing fibre corresponding to that range bin.

32 Claims, 6 Drawing Sheets

DISTRIBUTED FIBRE OPTIC SENSING

FIELD OF THE INVENTION

This application relates to distributed fibre optic sensing, and in particular to a coherent Rayleigh backscatter distributed fibre optic sensor for detecting dynamic disturbances on a sensing optical fibre, and in particular to methods and apparatus for distributed acoustic sensing.

BACKGROUND OF THE INVENTION

Distributed acoustic sensing (DAS) based on Rayleigh backscatter is a known technique. The basic principle is that coherent illuminating radiation, typically in the form of one or more pulses of optical radiation, is used to repeatedly interrogate an optical fibre, referred to herein as the sensing fibre.

Consider that the sensing fibre is interrogated by a single pulse of coherent radiation launched into a first end of the sensing fibre. As the pulse propagates along the fibre the phenomenon of Rayleigh scattering from various inherent scatting sites within the optical fibre will result in some small proportion of the interrogating radiation being backscattered toward the first end, where it can be detected. The backscatter signal received back at the first end of the sensing fibre is thus a combination of various signals from different parts of the fibre illuminated by the pulse as it propagates. With coherent interrogating radiation the backscatter signal is thus an interference signal formed from radiation scattered from the various inherent scattering sites. As the scattering sites are effectively randomly distributed throughout the sensing fibre the intensity of the backscatter signal received will exhibit a random variation from one section of the fibre to the next. However, in the absence of any environmental stimulus acting on the fibre, the backscatter signal from a given portion of the sensing fibre will be the same from interrogation to interrogation, assuming the properties of the interrogating radiation are the same for each interrogation.

An environmental disturbance acting on a portion of the sensing fibre that results in an effective change of optical path length for that portion, such as a dynamic strain on the fibre, will however result in a change in the backscatter signal from that portion between interrogations. By monitoring the backscattered radiation received at the first end of the sensing fibre, e.g. using a suitable photodetector, such a change can be detected and used to indicate dynamic disturbances, e.g. incident acoustic waves, acting on the relevant portion of sensing fibre.

In some DAS systems each interrogation comprises launching a single continuous pulse of interrogating radiation. In such systems the backscatter signal is typically processed to look for intensity variations in the backscatter from various longitudinal sensing portions of the optical fibre in order to detect disturbances acting on the sensing fibre. In other systems each interrogation may comprise launching (at least) two spatially separated optical pulses, which may be at different frequencies, and in such systems the processing may look for changes in phase of the measurement signal from a given sensing portion, possibly at a carrier frequency defined by the frequency difference between the pulses.

Location along the sensing fibre is determined based on OTDR (optical time domain reflectometry) techniques, with the backscatter signals being processed in time bins corresponding to backscatter from defined portions of the fibre. This technique relies on the fact that light detected a given time after the interrogating radiation was launched into the sensing fibre must have been scattered from a given position along the length of the sensing fibre. However for this assumption to be correct the backscatter detected must be uniquely associated with a given interrogation, thus a second interrogation (with the same optical properties as a first interrogation) cannot be launched into the fibre until light from the first interrogation has reached the distal end of the fibre and then any backscatter has travelled the entire length of the fibre back toward the detector and has been detected. Were the second interrogation to be launched whilst radiation from the first interrogation was still propagating in the sensing fibre it wouldn't be possible to distinguish backscatter arising from the first interrogation (from relatively far into the fibre) from backscatter from the second interrogation (from nearer the first end of the fibre).

This limits the repetition rate for interrogations to the round trip time in the fibre. The maximum pulse rate, $R_P$, is thus $R_P = c/2Ln$, where c is the speed of light in vacuo, L is the length of the fibre (or, for very long fibres, the threshold distance into the fibre from which no significant backscatter can be expected) and n is the refractive index. For a fibre with a length L of 5 km and a refractive index of about 1.5 the maximum pulse repetition rate, $R_P$, is of the order of 20 kHz. This sets the Nyquist limit for the frequency of acoustic stimuli that can be reliably detected.

It has been proposed to improve the pulse repetition rate by using wavelength divisional multiplexing techniques, e.g. by launching a first interrogation at a first wavelength and then a second interrogation at a second wavelength. As the interrogations use different wavelengths the backscatter from each interrogation can be separately identified and processed, thus allowing radiation from both interrogations to be propagating in the fibre at the same time without introducing any positional ambiguity.

However the use of wavelength division techniques necessitates multiple sources and detectors and adds to the cost and complexity of the interrogator unit.

In addition the spatial resolution achievable by such DAS sensors depends, at least partly, on the pulse duration. For a single pulse DAS sensor the minimum size of a sensing portion is effectively defined by the pulse duration, and thus the spatial length of the pulse in the fibre. At any instant the backscatter received back at the first end of the fibre corresponds to the backscatter from a section of fibre of a length equal to half the length of the pulse in the fibre. Thus it would not be possible to independently sense signals affecting sensing portions of the fibre at a length shorter than this. To provide a better spatial resolution would require shorter pulses, but shorter pulses involve transmitting less optical power into the sensing fibre (the maximum intensity of the pulses is limited by the need to avoid non-linear effects in the fibre). Reduced energy of the interrogating radiation results in reduced sensitivity. Thus for conventional DAS sensors there is a trade-off between sensitivity and spatial resolution.

SUMMARY OF THE INVENTION

Embodiments of the present invention relate to methods and apparatus for distributed fibre optic sensing with improved performance.

Thus according to an aspect of the invention there is provided a distributed fibre optic sensor apparatus comprising:

an optical generator configured to repeatedly generate a first coded sequence of optical radiation to be launched, in use, into a sensing optical fibre, the first coded sequence being encoded according to a polylevel coding sequence;

a detector configured to detect optical radiation which has been Rayleigh backscattered from within the sensing optical fibre; and a processor configured to process the output of the detector, wherein said processing comprises, for at least one range bin, correlating a detection signal derived from the detector output with the polylevel coding sequence at a time delay corresponding to that range bin.

Embodiments of the present invention thus repeatedly interrogate the sensing fibre with a coded sequence of optical radiation. This means that the fibre may be effectively continuously interrogated with radiation, i.e. a continuous wave form of interrogation may be used. This substantially increase the amount of optical power transmitted into the optical fibre and can provide signal to noise benefits compared to conventional Rayleigh based distributed acoustic sensing methods. To provide spatial resolution the backscatter signal is correlated with a suitably delayed version of the polylevel coding sequence. The use of a polylevel coding sequence allows the autocorrelation properties of the transmitted sequence to be optimised.

The first coded sequence of optical radiation may comprise a sequence of chip periods. An optical property of the optical radiation may be modulated according to an encoding value of the polylevel coding sequence which is constant over a chip period.

The polylevel coding sequence may be selected to have a mathematic autocorrelation function which is non-zero when the correlation is in phase and a value of zero when delayed by an amount equal to a multiple of the chip period.

As will be described in more detail later in some embodiments the polylevel coding sequence is based on a Frank code.

In some embodiments a single code may provide the entirety of the first coding sequence. In some embodiments however the polylevel coding sequence may be based on a plurality of complementary codes, i.e. a sequence of complementary codes that collectively provide a useful autocorrelation function.

In some embodiments the polylevel coding sequence comprises a sequence of encoding values, the sequence being of length $P^2$, wherein the $M^{th}$ encoding value of the sequence is equal to:

$$k.i.j \text{ modulo } P;$$

where $M=i+(j\times P)$; i and j can each take any values between and including 0 and $(P-1)$ and k is a constant. The value of k may, in some embodiments, be equal to $2\pi/P$.

The optical generator may be configured to modulate the phase of the first coded sequence of optical radiation according to the polylevel coding sequence. In other words the polylevel coding sequence may comprise a polyphase code.

The optical generator may comprises an optical source for generating a continuous wave optical signal and a first modulator for modulating the continuous wave optical signal based on the polylevel coding sequence to generate the first coded sequence of optical radiation. For a polyphase code the first modulator may comprise a phase modulator. The optical generator may comprise a code generator for driving the modulator with a drive signal, wherein the value of the drive signal is modulated based on the polylevel coding sequence.

In some embodiments the code generator may be configured to generate the drive signal based on a digital code signal. The code generator may comprise a code optimisation module for comparing a feedback signal derived from the first coded sequence of optical radiation before transmission with a reference version based on the polylevel coding sequence and deriving a correction to a signal of the code generator. Where the code generator generates the drive signal based on a digital code signal the correction may be a pre-correction to be applied to the digital code signal.

The code generator may comprise a digital to analogue converter (DAC) for receiving the digital code signal and generating a code waveform and an amplifier, which is downstream in a signal path from the DAC, for producing the drive signal. In some embodiments an edge enhancer may be located in the signal path between the DAC and the amplifier, the edge enhancer being configured to reduce a transition time between signal levels in the code waveform. The edge enhancer may, for instance, comprise a track-and-hold circuit configured to operate in a hold mode during a period when the DAC transitions from outputting a first signal level for the code waveform to a second signal level. In the hold mode the track-and-hold circuit will hold its output at a first signal level as the code waveform output. Subsequent to operating in the hold mode the track-and-hold circuit may operate in a track mode to track the second signal level.

In some embodiments the optical generator may comprise a splitter for splitting the continuous wave optical signal generated by the optical source into both a launch signal in a launch path which includes said first modulator and a local oscillator signal in a local oscillator path and wherein the apparatus comprises a mixer for mixing optical radiation which is backscattered from the sensing fibre with the local oscillator signal prior to being detected by said detector. In some embodiments a second modulator may be provided for introducing a frequency difference between the launch signal and the local oscillator signal. The second modulator may, for example, comprise an acousto-optic modulator in the launch path.

The optical generator may be configured to generate repeated instances of the first coded sequence at a code repetition rate. In some embodiments the frequency difference between the launch signal and the local oscillator signal may be equal to an odd integer multiple of a quarter of the code repetition rate. In which case the processor may be configured to, for at least one range bin, take a first backscatter signal detected in response to a first launch of the first coded sequence of optical radiation and a second backscatter signal detected in response to a second launch of the first coded sequence of optical radiation and process said first and second backscatter signals as in-phase and quadrature components to provide a demodulated backscatter signal as the detection signal.

The local oscillator path and the part of the launch path between the optical source and the first modulator may comprise components that maintain polarisation state. A polarising beam splitter may be provided for splitting optical radiation which is backscattered from the sensing fibre into first and second orthogonal polarisation states. A polarising beam splitter may also be arranged for splitting the local oscillator signal into the first and second orthogonal polarisation states. The mixer may configured such that, for each of the first and second polarisation states, optical radiation backscattered from the sensing fibre is mixed with the local oscillator signal of the corresponding polarisation state prior to being detected separately by the detector.

The mixer may additionally or alternatively be configured to mix optical radiation which is backscattered from the sensing fibre separately with first and second local oscillator signals to produce respective first and second mixed signals, wherein the first and second local oscillator signals have a phase difference of π radians from one another. The detector may be configured to detect the first and second mixed signals separately and subtract the detector outputs to the first and second mixed signals from one another to provide the detection signal.

In embodiments with a local oscillator path and a code optimisation module there may be a code optimisation detector configured to receive a version of the first coded sequence of optical radiation before transmission which is mixed with the local oscillator signal. The feedback signal may be derived from this detector output.

Whilst the apparatus may be implemented to provide a signal from just one range bin in practice the sensor apparatus may be used to provide measurement signals from a plurality of different sensing portions of the fibre—each sensing portion corresponding to one or more range bins. Thus the processor may be configured to, for each of a plurality of different rage bins, derive a detection signal from the detector output and correlate the detection signal with the polylevel coding sequence at a time delay corresponding to that range bin. Based on the correlation, the processor may generate an absolute phase value for each of the range bins in response to each launch of the first coded sequence of optical radiation. The processor may be configured to differentiate the phase values for each of a plurality of longitudinal sensing portions of the sensing fibre to provide an indication of the change of phase for such sensing portions.

In use the distributed fibre optic sensor apparatus will be coupled to a first length of optical fibre configured as the sensing optical fibre. The apparatus may therefore comprise an interrogator unit that may be connected to a suitable optical fibre in use. The sensing optical fibre may therefore comprise part of the apparatus in use.

The apparatus may be used in a range of different applications. One particular application is to seismic monitoring of earth formation such as reservoirs, e.g. hydrocarbon reservoirs or reservoirs for sequestration of material, e.g. carbon sequestration. In some applications therefore the sensing fibre may be deployed to run along at least part of at least one borehole. The borehole may be a wellbore and may be a wellbore of a production or injection well. The optical fibre may for instance be permanently installed in the wellbore, for example affixed to a well casing. Alternatively the borehole may be an observation borehole. Alternatively for surface seismic surveying the sensing fibre may be deployed at or near the surface of an area of interest, e.g. buried to run in a desired path near the surface of an area of interest.

A seismic sensing apparatus may therefore comprise a distributed fibre optic sensor apparatus as described in any of the variant above being coupled to a sensing optical fibre deployed in an area of interest. In this case the processor may be configured to process the output of the detector to provide a measurement signal from each of a plurality of sensing portions of the sensing fibre indicative of seismic signals incident at said sensing portion. In some seismic surveys the area of interest may be stimulated with a seismic source and the processor may be configured to correlate the measurement signal with a seismic stimulus applied to the area of interest.

The distributed fibre optic sensor apparatus may be used for a range of other applications however. A sensing fibre deployed in wellbore may be used for monitoring various stages in well completion and/or operation, such as perforation, hydraulic fracturing and/or in-flow monitoring for example. The sensing fibre may be deployed along a perimeter to be monitored for perimeter monitoring or deployed alongside a conduit such as a pipeline for flow monitoring, leak detection and/or detection of third party interference. The sensing fibre may be deployed alongside part of a transport network, e.g. a road or railway to provide traffic monitoring/detection and/or control of the transport network.

In another aspect there is provided a method of distributed fibre optic sensing comprising:
repeatedly launching a first coded sequence of optical radiation into a sensing optical fibre, the first coded sequence being encoded according to a polylevel coding sequence;
detecting optical radiation which has been Rayleigh backscattered from within the sensing optical fibre; and
processing the output of the detector, wherein said processing comprises, for at least one range bin, correlating a detection signal derived from the detector output with the polylevel coding sequence at a time delay corresponding to that range bin.

The method may be implemented in any of the variants discussed above.

DESCRIPTION OF THE DRAWINGS

The invention will now be described by way of example only, with reference to the accompanying drawings, of which.

DESCRIPTION OF THE INVENTION

Embodiments of the present invention relate to methods and apparatus for distributed fibre optic sensing, in particular to Rayleigh backscatter based distributed fibre optic sensing, for example distributed acoustic sensing (DAS). In embodiments of the present invention an optical generator is configured to repeatedly generate a first coded sequence to be launched into the sensing optical fibre. A detector is arranged to detect radiation which is backscattered from within the optical fibre. A processor is configured to process the output of the detector, which involves, for at least one range bin, correlating a detection signal derived from the detector output with the coding sequence used to produce the first coded sequence at a time delay corresponding to that range bin.

Embodiments of the present invention thus use a coded OTDR technique. The basic principal of coded OTDR is that the transmitted light has an optical property, such as phase, polarisation state or amplitude for example, which is modulated according to a predetermined coding sequence. The length of the coding sequence is arranged to have a length such that the resultant coded sequence of optical radiation has an overall temporal length, i.e. duration from the start to the end of the sequence, which is relatively long and which may, in some embodiments be at least as long as the time taken for light to propagate along the whole length of the fibre and back again, i.e. the round trip time of flight to and from the end of the fibre. This coded sequence of light is transmitted into the sensing fibre and any backscatter detected. The backscatter received at any instant will thus be a summation of the scattering from different sections of the fibre illuminated by different parts of the coded sequence at different times. To provide location discrimination the backscatter signal is detected and processed in at least one range bin, wherein in each range bin the backscatter signal detected is correlated with the predetermined coding sequence after a delay from transmission of the start of the sequence corresponding to the round trip transit time to the relevant range bin.

If the code used for the first coded sequence is designed correctly then, when correlated with the known form of the first coded sequence, only the components of the detected signal which are modulated in the same way as the coded sequence (i.e. the modulation of the relevant optical property of the backscatter radiation is in phase with the correlating coding sequence) is recovered and the other components are suppressed.

Figure 1:
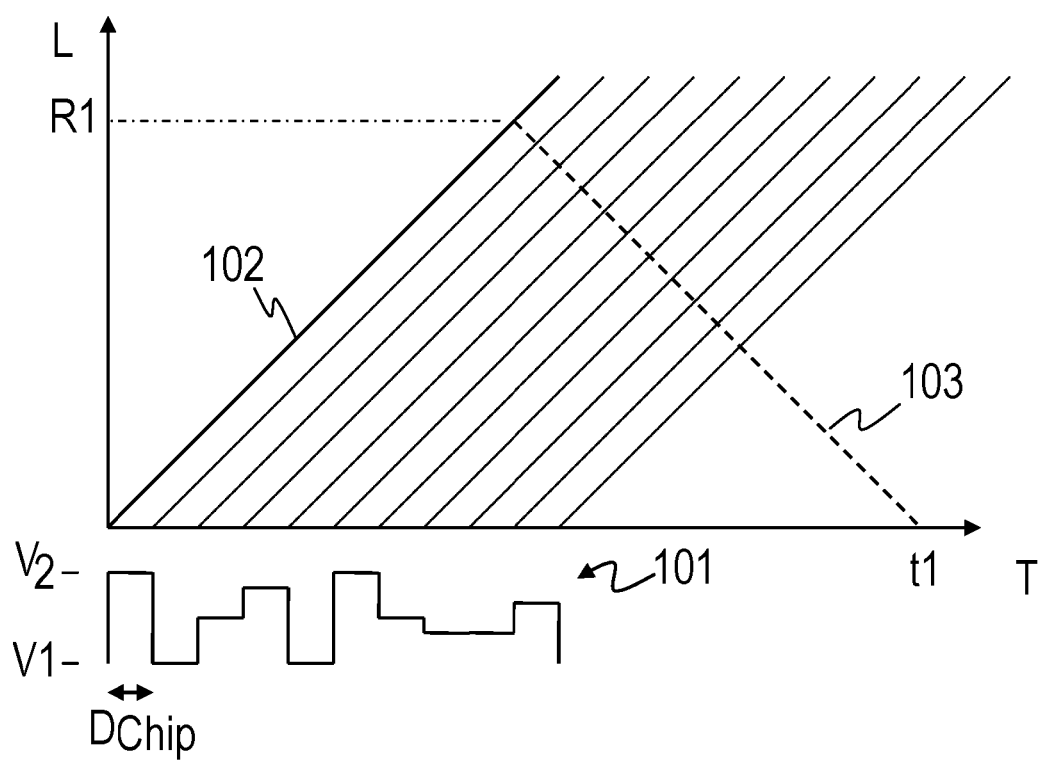
FIG. 1 illustrates the principles of coded OTDR.

FIG. 1 illustrates this principle. FIG. 1 shows a first coding sequence 101. The coding sequence 101 comprises a sequence of periods, referred to herein as chips or chip times/periods, of duration $D_{chip}$. The value of the coding sequence has a constant value during each chip time $D_{chip}$ and the value of each successive chip is determined by a base code, as will be explained in more detail later. This coding sequence may be used to modulate an optical property of the transmitted light, e.g. an applied phase modulation, to generate the first coded sequence of optical radiation. Thus the first coded sequence of optical radiation will comprise a sequence of chip periods of a constant optical property, say phase modulation, with the phase modulation between successive chip periods being determined by the base code.

FIG. 1 shows a coding sequence of just ten chips in length for clarity but in practice the coding sequence may be much longer and, as mentioned, may have a duration which is at least as long as the round-trip time take for light to propagate the entire length of the fibre.

FIG. 1 also shows a plot of length along the fibre against time showing how the coded optical sequence propagates along the fibre. At time T=0 the coded optical sequence starts to be launched into a first end of the fibre. The transmitted light will propagate at a constant speed equal to c/n where c is the speed of light in vacuo and n is the refractive index of the fibre. Line 102 illustrates how the leading edge of the first chip of the coded sequence progresses along the fibre and the dotted lines illustrate the propagation of the leading edges of the subsequent chips.

Any backscatter from the inherent scattering sites along the fibre will result in at least some light propagating back towards the first end of the fibre, again at the same constant speed. Thus any light received back at the first end of the fibre at a time $t_1$ after start of the launch of the sequence must have travelled along at least part of the trajectory indicated by dashed line 103. It can thus be seen that the light received back at the first end of the fibre at a time $t_1$ could be light scattered from different parts of the fibre from any of the ten chips illustrated. However only light received from a first range into the fibre, $R_1$, will be modulated in a sequence that is exactly in time with the coded sequence starting from the first chip. Light scattered from a different part of the fibre will be modulated in a sequence corresponding to a different part of the code, and will be out of time with a correlation starting with the first chip.

Thus by detecting the relevant optical property being modulated and running the correlation between the known coding sequence and backscatter radiation received at a time starting at $t_1$ after launch of the start of the coded sequence the correlation will highlight the backscatter components received from a range $R_1$ into the fibre. By running multiple correlations, each at different delays, the backscatter from multiple different ranges into the sensing fibre can be identified, essentially simultaneously.

It should be noted that if the bandwidth occupied by the coded sequence is $f_{Bit}$ then the temporal resolution, and hence spatial resolution, at the correlator output will be approximately $f_{Bit}^{-1}$ and this will be the case irrespective of the length of the coding sequence, i.e. base code. Thus an advantage of the approach of embodiments of the present invention is that the length or duration of the coded sequence of optical radiation, and hence the energy of the interrogating radiation transmitted into the sensing fibre, is independent of the resultant spatial resolution. This avoids the problem noted above with conventional DAS sensors and means that the length of the first coded sequence can be as long as desired. The can result in a significant increase in the sensing duty cycle, i.e. the proportion of time that a given part of the sensing fibre is illuminated with interrogating radiation, compared with the conventional pulse based DAS approaches. If the duration of the coding sequence is at least as long as the round trip time taken for light to propagate to the end of the fibre and back then the coding sequence can be used repeatedly in a continuous sequential manner, i.e. the sensing fibre may effectively be interrogated using substantially continuous wave (CW) interrogating radiation. Thus a first instance of the first coded sequence of optical radiation may be launched into the fibre as a first interrogation followed immediately by a second instance of the first coded sequence of optical radiation. If the modulation applied to the optical radiation is a phase or polarisation modulation then the sensing fibre can thus be illuminated substantially continuously in use with optical radiation of a generally constant intensity.

This can provide a significant improvement to signal-to-noise ratio (SNR). For example for a conventional pulse based DAS sensor the spatial sensing portions may be of the order of 10 m say. For a 5 km long sensing fibre this implies an interrogation duty cycle for a given sensing portion of about 1/500 (at maximum pulse repetition rate), which is a 27 dB deficit in possible SNR compared to CW sensing.

It should be noted that the code may have a duration which is longer than the round trip transit time of light in the fibre but this may impact on the maximum sampling rate of the sensor. It will be appreciated that each transmission of a coded sequence in effect is an interrogation of the fibre and thus the duration of the code determines the period between interrogations and thus the sampling rate. Using a code with a duration significantly longer than the round trip transit time of light in the fibre thus reduces the same rate, and hence the maximum frequency of disturbances, e.g. acoustic signals acting on the fibre, that can be correctly sensed.

A code length shorter than the round trip transit time may be used, but in which case to maintain the desired autocorrelation properties after one code is completed a complementary code should be transmitted where the group of complementary codes propagating in the fibre at any one time provide the desired autocorrelation response.

The base code (or group of codes) used for the first coded sequence is chosen to have desired autocorrelation properties. Ideally, for a single repeated code, the autocorrelation should exhibit a strong central peak when the correlation is exactly in phase and with a near-zero side-lobe response when the code is not in phase. For a group of complementary codes it is the autocorrelation of the group of codes that provides a similar response. Suitable complementary codes may be difficult to identify with long sequences however and thus in some embodiments a single repeated code with a code length at least as long as the round trip transit time of light along the entire fibre and back may be used.

In some embodiments of the present invention the base code used to encode the first coded sequence may be a polylevel code, and may, in particular be a Frank code.

As used in the present specification the terms "polylevel" and "polylevel code" shall be mean that the individual chips of the coding sequence can take more than two possible values, at least between two limits. In other words if a code is a sequence of individual encoding values, for a polylevel code there are more than two possibilities for each encoding value. A polylevel code is thus distinguished from a binary code where each chip is restricted to one of two possible values, say 0 and 1. For a phase modulation a binary code may translate, for example to phase modulations of 0 or $\pi$. For a polyphase code there may be more than one possible non-zero value and thus three or more possibilities for an encoding value, for example each element of a base code may be able to take a plurality of non-zero values between 0 and 1, which for a phase modulation could translate to a first coded sequence where each chip has a phase modulation between $-\pi$ and $\pi$ for example. FIG. 1 illustrates that the coding sequence 101 may be a polyphase code, i.e. encoded based on a polyphase code, with each chip having a value between $V_1$ and $V_2$ and a range of more than two possible values.

In embodiments of the invention the first coded sequence of optical radiation may comprise a digitally encoded quadratic phase, i.e. a linear frequency chirp. In some embodiments the first coded sequence of optical radiation may be encoded according to a Frank code, as will be explained in more detail below. In other embodiments the code may be a Lewis Kretschmer code.

As discussed above the detected backscatter signal for a Rayleigh backscatter distributed fibre optic sensor can be seen as a superposition of the interrogating optical signal delayed by the transit time to and from each scattering site illuminated by the interrogating optical signal. Correlating the detected signal with the coding sequence used to generate the first coded sequence will yield a result which gives the reflection power and phase at the position equal to the transit time defined by the delay between the launched first coded sequence and the correlating code. However there will be an unwanted crosstalk component which is generated by the other off peak reflections, but the crosstalk power is reduced by an amount equal to the correlation side-lobes of the code.

Coded OTDR has been proposed previously in other fields, for instance free space LIDAR. However in such applications the number of possible targets that can be illuminated by the launch signal is typically limited. Such coded OTDR systems have thus typically used a binary coded launch signal, i.e. the base encoding varies between only two values, say 1 and 0, and the optical property of the launch signal modulated by the code thus also takes one of two values, say amplitude 0 or A. One such form of binary code is a Pseudorandom code.

For a specific code length of N, i.e. N chips, the autocorrelation of such a binary code yields a result that has amplitude N when the returned signal is in phase with the correlation and a value of −1 elsewhere.

Such a code would be useful where there are a limited number of possible targets that can provide reflected signals to superimpose. However for distributed fibre optic sensing there are a large number of inherent scattering sites, each providing a weak backscatter signal. The detected backscatter is thus a superposition of weak scattering of the launch signal from an effective continuum of scattering sites.

Thus consider that a coded sequence of N chips was transmitted into the fibre such that backscatter from any of the N chips could be received at the detector at any instant. When correlated, the amplitude of the backscatter signal modulated in phase with the known code would be N and thus the required signal term would have an optical power of $N^2$. However there would be a crosstalk component from the whole of the rest of the coded sequence and thus the crosstalk component would also have an optical power of $N^2$, meaning that the signal component would be effectively lost in the noise due to the cross-talk. Such a system would be untenable for DAS.

It would be possible to use a binary pseudorandom code if the resulting coded sequence had a length, i.e. duration was significantly longer than the round trip travel time along the entire length of the fibre, such that the backscatter signal received at the detector at any instant only corresponded to scatter from a fraction of the overall coded sequence. However in order to provide sufficient signal to noise the duration of the coded sequence, would have to be significantly longer than this round trip travel time, and correlation would need to be performed over the whole coded sequence. This would limit the maximum code repetition rate and thus impact on the Nyquist limit of signals that could be detected using the sensor, which may adversely impact on the practicality of the system.

In embodiments described herein the first coded sequence may be encoded according to a polylevel code. The polylevel code may be chosen such that its mathematical autocorrelation results in a non-zero value (of N) when in phase (for a code of length N) and a value of 0 when delayed by an amount equal to a multiple of the chip duration. The code may in particular be a Frank code or a Lewis Kretschmer code. The code may have a duration that is not significantly longer than the round trip travel time of light in the sensing fibre, for instance a duration of less than 110% or 105% or less than 101% of the round trip travel time of light in the sensing fibre.

A Frank code, which is not a pseudorandom code, is a code having the form generally:

$$s_{M=(i+(j\times P))} = k.i.j(\bmod P) \quad i=0 \ldots (P-1), j=0 \ldots (P-1) \qquad \text{Eqn (1)}$$

where $S_M$ is the $M^{th}$ encoding value of the code. The indices $i$ and $j$ are zero-based indices that each run from 0 to (P−1). The indices can be seen as row and column indices of a P×P matrix of the form:

$$\begin{pmatrix} 0 & 0 & 0 & \cdots & 0 \\ 0 & 1 & 2 & \cdots & (P-1) \\ 0 & 2 & 4 & \cdots & 2(P-1) \\ 0 & 3 & 6 & \cdots & 3(P-1) \\ \vdots & \vdots & \vdots & \ddots & \vdots \\ 0 & (P-1) & 2(P-1) & \cdots & (P-1)^2 \end{pmatrix} \pmod{P} \quad \text{Eqn (2)}$$

The code, having a length $N=P^2$, is formed be concatenating the row of this matrix, i.e. reading across the rows one by one, and multiplying each value by k, which is chosen according to the type of modulation to be applied. For a phase modulation the value k may be:

$$k = \frac{2\pi}{P} \quad \text{Eqn (3)}$$

so that the phase values of the $\Phi_{i,j}$ of the code are given by:

$$\phi_{i+(j\times P)} = \frac{2\pi}{P} . i.j \quad \text{Eqn (4)}$$

For example consider the 3×3 matrix:

$$\begin{pmatrix} 0 & 0 & 0 \\ 0 & 1 & 2 \\ 0 & 2 & 4 \end{pmatrix} \quad \text{Eqn (5)}$$

Reading the rows in sequence and multiplying by $2\pi/4$ gives the phase code values:

TABLE 1

| $\Phi_0$ | $\Phi_1$ | $\Phi_2$ | $\Phi_3$ | $\Phi_4$ | $\Phi_5$ | $\Phi_6$ | $\Phi_7$ | $\Phi_8$ |
|---|---|---|---|---|---|---|---|---|
| 0 | 0 | 0 | 0 | $\frac{2\pi}{3}$ | $\frac{4\pi}{3}$ | 0 | $\frac{4\pi}{3}$ | $\frac{2\pi}{3}$ |

Note that the phase code value $\Phi_8$ can be determined by taking the relevant matrix value, 4 and applying the modulo operation, i.e. 3 (mod 4)=1, or equivalently by taking the resultant phase value and applying a phase wrap of $2\pi$.

Adjusting these values to give a phase modulation shifted in the interval $[-\pi, \pi]$ gives the phase code modulation:

TABLE 2

| $\Phi_0$ | $\Phi_1$ | $\Phi_2$ | $\Phi_3$ | $\Phi_4$ | $\Phi_5$ | $\Phi_6$ | $\Phi_7$ | $\Phi_8$ |
|---|---|---|---|---|---|---|---|---|
| $-\pi$ | $-\pi$ | $-\pi$ | $-\pi$ | $\frac{-\pi}{3}$ | $\frac{\pi}{3}$ | $-\pi$ | $\frac{\pi}{3}$ | $\frac{-\pi}{3}$ |

Figure 2:
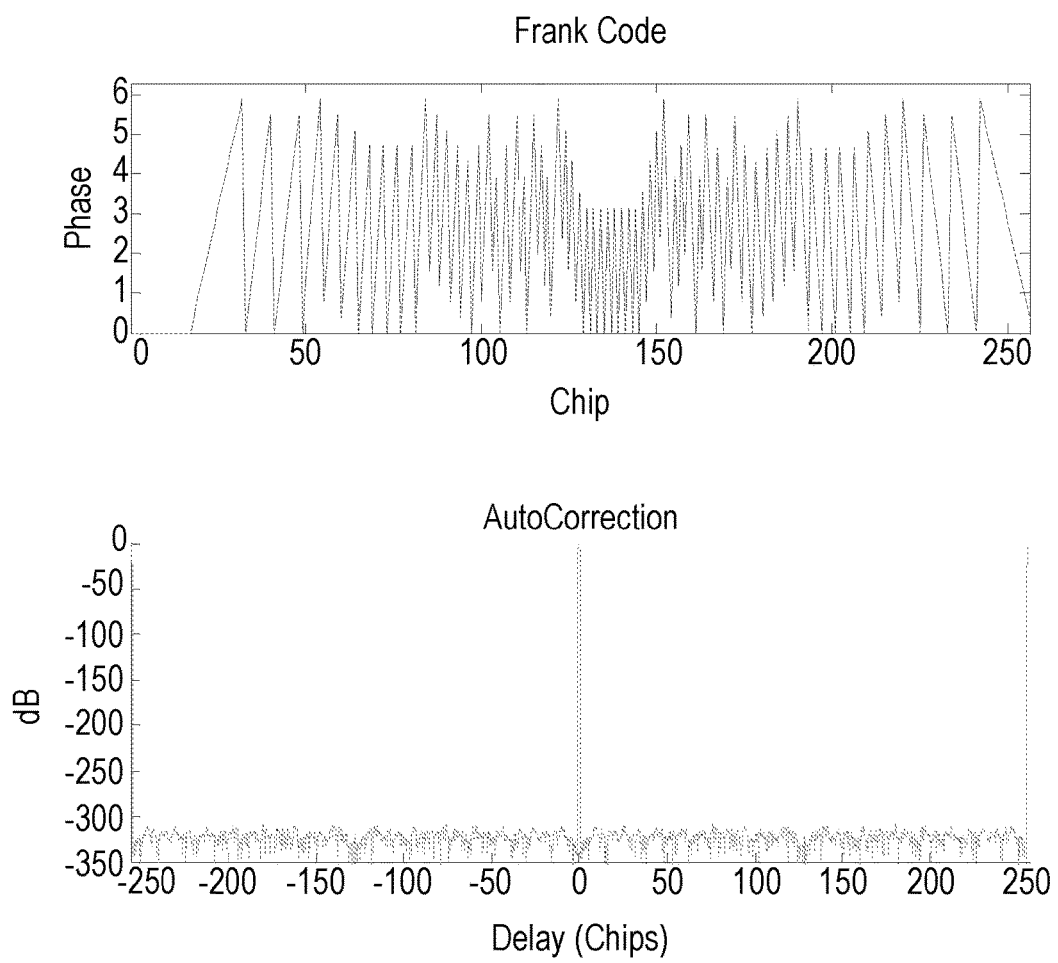
FIG. 2 illustrates an example of a polylevel code and its autocorrelation.

FIG. 2 illustrates a plot of a Frank code of length N=256 (=$16^2$) and the corresponding autocorrelation function. The top plot shows the encoding value (in terms of a phase modulation in radians between 0 and $2\pi$ in this instance). The lower plot illustrates the simulated autocorrelation in terms of dB. It can be seen that the side-lobe rejection in this simulation is of the order of $-325$ dB and this is actually mainly due to rounding errors with the simulation, the perfect code would theoretically have zero spatial crosstalk.

Some embodiments of the invention thus transmit the first coded sequence of optical radiation encoded according to a polylevel code, e.g. a polylevel Frank code. The first coded sequence may thus be seen itself as a polylevel code sequence, e.g. a polyphase code if used for a phase modulation.

Figure 3:
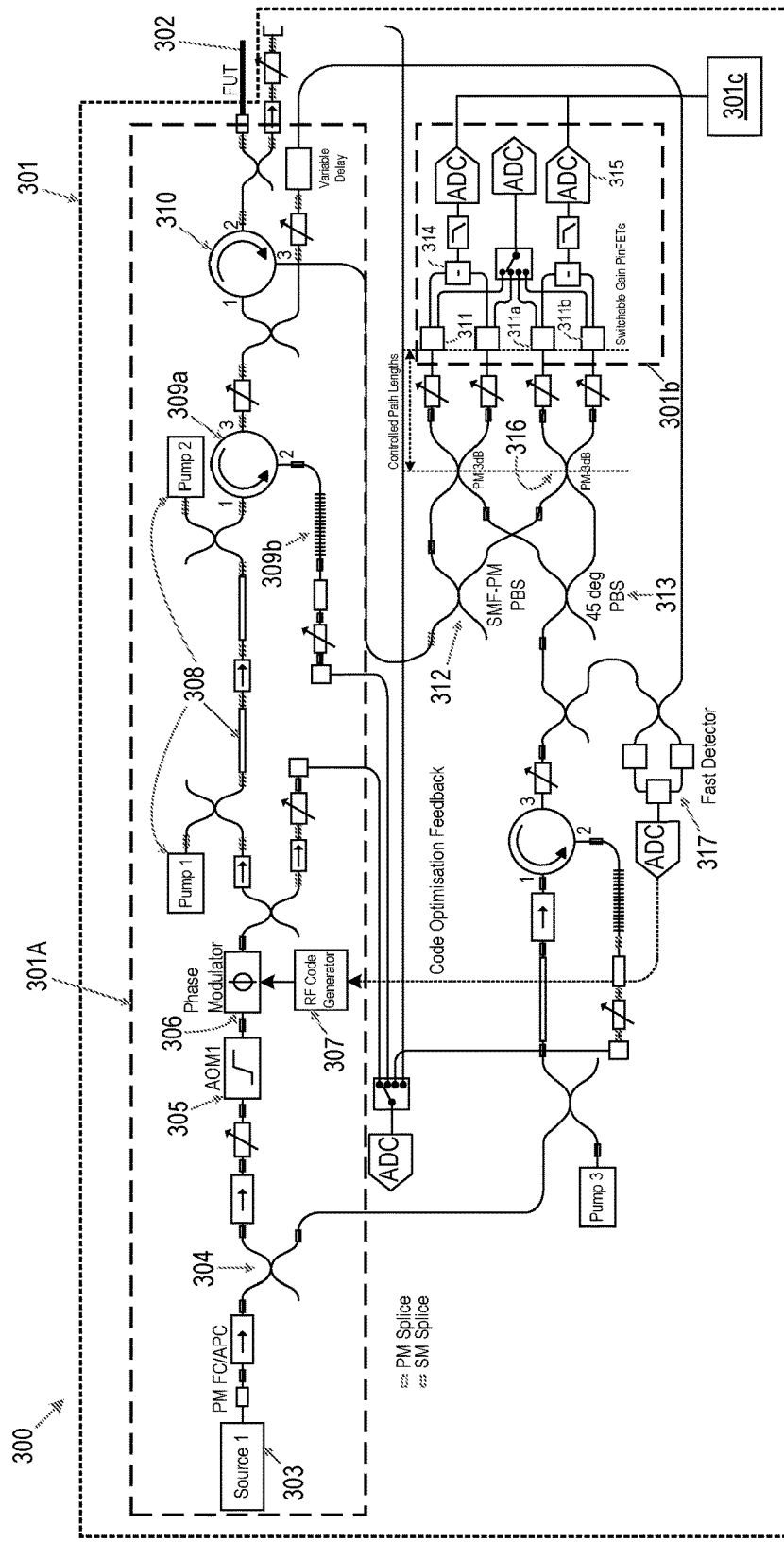
FIG. 3 illustrates a distributed fibre optic sensing apparatus according to an embodiment.

FIG. 3 illustrates an example of a Rayleigh backscatter fibre optic distributed acoustic sensor apparatus 300 according to an embodiment of the invention.

An interrogator unit 301 connects to a sensing optical fibre 302, which, as for conventional DAS, may be a standard optical fibre such as typically used for telecommunications, e.g. a single mode optical fibre. The interrogator unit comprises generally an optical generator 301a for generating and launching the first coded sequence of optical radiation into the sensing fibre, a detector 301b for detecting the backscatter radiation and a processor 301c for processing the detector output as will be described below.

The optical generator 301a has a coherent, low phase noise optical source 303, such as a stable laser. The optical source 302, e.g. the laser, is operated to provide a coherent and stable continuous wave optical output. Note as used herein the term optical does not restrict to visible light and the term optical shall be meant to include electromagnetic radiation at ultraviolet or infrared wavelengths and the term light shall likewise be meant as encompassing such radiation.

The output from optical source 303 is input to a first splitter which splits the light into two paths, a launch path for illuminating the sensing fibre 302 and a local oscillator path. The light in the local oscillator path is used as phase reference and pre-detection amplifier as will be described in more detail later.

In some embodiments the light in the launch path may be upshifted in frequency by a suitable modulator 305, such as an acousto-optic modulator (AOM). The frequency shift may be of the order of 200 MHz or so. The frequency shifted light may then be phase modulated by the predetermined code, e.g. a polylevel Frank code, by phase modulator 306.

The phase modulator may be controller by a code generator 307, which drives the modulator with a drive signal. The code generator controls the phase modulation applied for each of a plurality of chip times of equal duration in accordance with the encoding values of the predetermined code. In some embodiments the predetermined encoding values may be stored in a suitable memory, e.g. a look-up table or register or the like, and thus generating the code may simply comprise reading the relevant encoding values and outputting the relevant value for the chip duration. If the code is sufficiently long the code may be continuously repeated and thus the code generator may cyclically read the stored encoding values for the individual chips of the code.

The phase modulator may thus apply a phase modulation over the range $-\pi$ to $+\pi$ depending on the encoding value. Suitable fast phase modulators are known for phase modulation in the telecoms industry and such a known phase modulator may be suitable for use in embodiments of the present invention. The phase modulator should ideally provide a fast transition rate between $-\pi$ and $+\pi$ whilst maintaining a relatively low drive voltage $V_\pi$ for a phase shift of $\pi$ radians. A phase modulator may for example have 10 GHz bandwidth and a $V_\pi$ of 4.5V or lower. Ideally the phase modulator should also exhibit good linearity to maintain code fidelity although as will described below a feedback arrangement may help preserve code fidelity.

The phase modulated light may be input to an amplifier 308 which may for instance comprise an erbium doped fibre amplifier (EDFA). In this embodiment as the output from the phase modulator is a CW (continuous wave) phase-modulated output the EDFA thus runs at constant intensity, unlike pulse based schemes which exhibit a variation in intensity over time. This promotes stability of the EDFA and improves noise characteristics.

The output of the amplifier may be filtered, e.g. by reflection from a narrow band optical filter 309, which in this embodiment comprises a circulator 309a configured to route light from the amplifier to a narrow band granting 309b, e.g. a 25 GHz grating. This reduces the ASE (amplified spontaneous emission) power in the transmitted optical signal and thus reduces noise. Light reflected from the grating is routed towards the sensing fibre 102 via a circulator 310.

The output from the optical generator 301a and thus from the interrogator unit 301 thus comprises a first coded sequence of CW optical radiation, in this embodiment with a phase modulation according the predetermined encoding values of the based code.

Backscatter light received back from the sensing fibre 302 is routed by circulator 310 towards the detector elements 311 of detector 301b.

As mentioned above this embodiment of the invention uses the optical source 303 to generate a local oscillator (LO) which is used for heterodyne detection. As noted above the transmitted light is generated by the optical source, at a base frequency which will be referred to as the LO frequency $\omega_{LO}$, and then has a frequency shift applied by the AOM 305. The AOM applies a frequency shift to introduce a frequency difference between the launched, and hence backscattered light, and the LO. This difference frequency introduced can thus be seen as introducing a carrier signal at a frequency $\omega_{Carrier}$ equal to the frequency shift imparted by the AOM 305. The weak backscattered light is thus mixed with the relatively strong LO and the mixed signal is detected by a detector 311. The detector will thus output the interference or beat signal between the two, i.e. a signal at the carrier frequency $\omega_{Carrier}$.

It should be noted that it would be possible to have a frequency modulator, e.g. an AOM, in the LO path, either instead of or in addition to the AOM 305 in order to introduce a frequency shift between the transmitted light and the LO. An AOM in the LO path does allow more control over where the carrier frequency is introduced, although an AOM used in the LO path should be chosen to be high quality to avoid introducing unwanted distortion.

Using heterodyne detection in this way provides high sensitivity as the weak backscatter signal received from the sensing fibre is effectively amplified by the stronger LO. In addition the phase of the backscattered light with respect to the LO is preserved and therefore the detection is phase sensitive and information about the transmitted phase can be recovered. As will be understood by one skilled in the art the phase information can be used to determine an indication of the disturbances acting on any section of the sensing fibre and the amount of phase change is quantitatively related to the effective path length change affecting the sensing portion and hence the magnitude of the disturbance, e.g. the applied strain.

Due the nature of the fibre being investigated, i.e. the sensing fibre, which as mentioned above may for example typically be standard single mode fibre, the state of the polarisation of the scattered light will be unknown. In the embodiment illustrated in FIG. 3 a polarisation diversity detection scheme is employed to improve satisfactory signal detection. The detected backscatter radiation is thus split by a polarising beam splitter 312 into first and second orthogonal polarisation states. The light in the local oscillator path from splitter 304 is also divided into the same polarisation states by polarising beam splitter 313. Each of the orthogonal polarisation states of the detected backscatter is thus mixed with the local oscillator signal of the corresponding polarisation state to generate a signal with an interference term.

The local oscillator path may thus be implemented so as to maintain the polarisation status of the LO output from the optical source 303. The local oscillator path may, for example, be at least partly implemented by polarisation maintaining fibre links between the splitter 304 and the detectors 311. Equally the paths for the backscatter signal from the polarising beam splitter 312 to the detector (some of which will be the shared paths for the mixed backscatter/LO signal) should also maintain polarisation, e.g. be implemented using polarisation maintaining fibre.

For the launch path the polarisation state of the signal to be transmitted may advantageously be maintained from the optical source 303 to the phase modulator 306 to ensure correct phase modulation. After this stage however it is no longer necessary to control the polarisation state of the signal, as it will be effectively randomised by the sensing fibre anyway. Thus the launch optics from the phase modulator 306 to the sensing fibre need not maintain any particular polarisation state and may, for example, be at least partly implemented by single mode fibre.

In the embodiment illustrated in FIG. 3, differential detection is employed to improve SNR and to reduce the effects of intensity noise. Thus, for each polarisation state, a first backscatter signal and mixed first local oscillator signal is detected by one detector element, e.g. 311a and another detector element 311b receives a second mixed signal where the backscatter is mixed with a second local oscillator signal, with the local oscillator shifted through a phase shift of $\pi$ radians compared to the first local oscillator signal. This may be achieved through the use of 2×2 couplers 316 where light input to a first input is passed to a first output with no phase shift but to the second output with a phase shift of $\pi/2$. Likewise light input to the second input goes to the second output with no phase shift but is phase shifted by $\pi/2$ at the second output. If the backscatter signal for one polarisation is supplied to the first input and the LO is supplied to the second input then the first output, e.g. that supplying detector 311a, receives the signal with no phase shifted mixed with the LO phase shifted by $\pi/2$ and the second output, e.g. that supplying detector 311b, receives the signal with the LO with no phase shift but the signal shifted by $\pi/2$. The net result is equivalent to a phase shift of $\pi$ in the LO at each detector. The signals from the two detectors 311a and 311b are subtracted, e.g. by subtractor 314. This has the result of doubling the signal of interest whilst reducing the unwanted intensity noise component which is common to both detectors.

This results in two channels corresponding to the two polarisation states of the backscatter signal mixed with the local oscillator. These signals are each then sampled by a high fidelity ADC 315.

As mentioned above the state of the polarisation of the scattered light from any given part of the fibre will be unknown. For a given position along the length of the fibre the effect of mixing the backscatter radiation with the local oscillator (at one polarisation state) could therefore give no response. By processing each of two orthogonal polarisation states separately it is ensured that there will be a mixing response in at least one of the polarisation channels for the backscatter from the portion of interest. The polarisation state that provides the largest signal response for the position of interest can be selected. However, it will be appreciated that it is not until after the correlation of the mixed backscatter/local oscillator signal with the known code that the response from the portion of interest can be detected. Thus determining the polarisation state leading to the largest signal response must be done in post-processing after correlation.

The digital signals from each polarisation detection path are thus passed to a processor 301c which demodulates the signals to derive a detection signal and then performs correlation with the reference code in each of a plurality of range bins, where in each range bin the correlation between the detected demodulated signal and the known coding sequence has a delay corresponding to the round trip transit time of light to and from that range into the fibre. The result of the correlation results in a determination of an absolute phase value for the signal from the relevant range into the fibre.

At this point the processing may select the largest signal from the polarisation states for each range bin and form a signal data set that provides the absolute phase as a function of position along the sensing fibre.

The method will provide a new independent measurement of the absolute phase for each range bin at a rate equal to the code repetition rate. In some embodiments the absolute phase may be differentiated at a given spatial gauge length to provide a change in phase over a given gauge length. This has the benefit of reducing any common phase noise generated by the optical source and means that the output of the DAS sensor may be directly comparable to the output of conventional two-pulse phase-based DAS sensors.

As mentioned above is necessary to demodulate the detected signals in order to perform the correlation. The demodulation could be performed solely in the digital domain using the detected signal output from the ADCs 315. However the real phase modulated carrier signal includes significant unwanted negative frequency components compared to the idealised complex form of the phase modulated carrier and these components degrade the side-lobe rejection.

As described above the first coded sequence of optical radiation launched into the sensing fibre comprises an optical signal at the base LO frequency, $\omega_{LO}$, which is modulated in frequency by the AOM 305 (at a carrier frequency $\omega_{Carrier}$) and then phase modulated according to a coding sequence $\Phi_{code}(t)$. The electric field of the transmitted signal, $E_{TX}$, can thus be seen as the real part of:

$$E_{TX}(t) = a_{TX} e^{i[(\omega_{LO}+\omega_{Carrier})t + \emptyset_{Code}(t)]} \quad \text{Eqn. (6)}$$

where $a_{TX}$ is the transmitted field amplitude.

The received field amplitude is given by the real part of the fibre path integral:

$$E_{RX}(t) = \int r(s).E_{TX}(t-\Delta t(s)).e^{i\Phi(s)}.ds \quad \text{Eqn. (7)}$$

$$= a_{TX} \int r(s).e^{i[(\omega_{LO}+\omega_{carrier})(t-\Delta t(s))+\emptyset_{Code}(t-\Delta t(s))+\Phi(s)]}.ds$$

where, at position s in the fibre r(s) is the reflectance per unit length, $\Delta t(s)$ is the round trip time of flight, and $\Phi(s)$ is the intrinsic phase shift and thus the desired property to be determined.

It may be assumed that the intrinsic phase shift $\Phi(s)$ is effectively constant for the duration of the code, i.e. that any disturbance acting on the fibre has a negligible effect at the time scale of the code repetition rate.

The heterodyne detection mixes this received electric field with a local oscillator field:

$$E_{LO} = a_{LO} \cdot e^{i\omega_{LO}t} \quad \text{Eqn. (8)}$$

at the detector, which has a 'square law' response. The detected heterodyne photocurrent, $I_{Signal}(t)$, is thus proportional to the square of the magnitude of the mixed field:

$$I_{Signal} \propto (E_{LO}(t)+E_{RX}(t))(E_{LO}(t)+E_{RX}(t)) \propto \quad \text{Eqn. (9)}$$

$$a_{LO}^2 + 2a_{LO}a_{TX}\int r(s).\cos[\omega_{Carrier}t -$$

$$(\omega_{LO}+\omega_{Carrier}).\Delta t(s) + \emptyset_{Code}(t-\Delta t(s)) + \Phi(s)].ds +$$

$$a_{TX}^2 \int\int r(s_1).r(s_2).\cos[(\omega_{LO}+\omega_{Carrier}).(\Delta t(s_2) -$$

$$\Delta t(s_1)) + \emptyset_{Code}(t-\Delta t(s_1)) - \emptyset_{Code}(t-\Delta t(s_2)) + \Phi(s_1) - \Phi(s_2)].$$

$$ds_1 ds_2$$

Note use has been made in the double integral of the fact that, for every pair $(s_1,s_2)$ there is an $(s'_1,s'_2)=(s_2,s_1)$ such that:

$$\Delta t(s'_2)-\Delta t(s'_1)=(\Delta t(s_2)-\Delta t(s_1)) \; \emptyset_{Code}(t-\Delta t(s'_1))-\emptyset_{Code}$$
$$(t-\Delta t(s'_2))=-(\emptyset_{Code}(t-\Delta t(s_1))-\emptyset_{Code}(t-\Delta t(s_2)))\emptyset$$
$$(s'_1)-\emptyset(s'_2)=-(\emptyset(s_1)-\emptyset(s_2)) \quad \text{Eqn. (10)}$$

Since optical power is proportional to the square of field amplitude the signal component at the detector output can be rewritten as:

$$I_{Signal} = G_R P_{LO} + 2G_R \quad \text{Eqn. (11)}$$

$$\sqrt{P_{LO}P_{TX}} \cdot \int r(s).\cos[\omega_{Carrier}t - (\omega_{LO}+\omega_{Carrier}).\Delta t(s) +$$

$$\emptyset_{Code}(t-\Delta t(s)) + \Phi(s)].ds + G_R P_{TX}$$

$$\int\int r(s_1).r(s_2).\cos[(\omega_{LO}+\omega_{Carrier}).(\Delta t(s_2)-\Delta t(s_1)) +$$

$$\emptyset_{Code}(t-\Delta t(s_1)) - \emptyset_{Code}(t-\Delta t(s_2)) +$$

$$\Phi(s_1) - \Phi(s_2)].ds_1 ds_2$$

where the constant of proportionality $G_R$ is the responsivity of the detector (which may be of the order of ~1 A W$^{-1}$ for some typical detectors at the likely wavelength of operation). $P_{TX}$ is the power launched into the fibre and $P_{LO}$ is the LO power.

For a DC coupled detector, after trans-impedance amplification at gain $G_T$ and digitisation at a sample rate $f_{sample}$ the signal at the output of the digitiser will be (ignoring noise components for this simple analysis):

$$D_{Het_j} = D_{Signal_j} \quad \text{Eqn. (12)}$$

$$= G_T[I_{Signal_j}]$$

$$= G_T G_R \left[P_{LO} + \sum_k p_{RX_k}\right] +$$

$$2G_T G_R \sqrt{P_{LO}} \sum_k \sqrt{p_{RX_k}} .\cos[\omega_{Carrier}j - (\omega_{LO} +$$

$$\omega_{Carrier}).k + \emptyset_{Code_{j-k}} + \Phi_k] +$$

-continued $$G_T G_R \sum_k \sum_l^{l \neq k} \left[ \sqrt{p_{RX_k} p_{RX_l}} \cdot \cos[(\omega_{LO} + \omega_{Carrier}) \cdot (l-k) + \emptyset_{Code_{j-k}} - \emptyset_{Code_{j-l}} + \emptyset_k - \emptyset_l \right]$$

Note all angular frequencies have been scaled by $f_{sample}^{-1}$. The summations are over all sample defined range bins along the fibre. $p_{RX_k} = r_k^2 P_{TX}$ is the power backscattered from the $k^{th}$ sample defined range bin.

It can therefore be seen that this signal is thus the sum of three separate terms. The these terms can be identified with physical phenomena as follows.

The first term is a dc term corresponding to the sum of constant intensity LO and total backscatter. The second term is a linear superposition of the LO-amplified, phase code modulated carrier signals from each sample defined range bin—which is the signal of interest. The final term is a linear superposition of baseband phase modulated co-interference terms. In practice the co-interference terms can be managed and the power of in this term is relatively small compared to the desired signal term.

The signal term of interest is thus:

$$2 G_T G_R \sqrt{P_{LO}} \sum_k \sqrt{p_{RX_k}} \cdot \cos\left[ \omega_{Carrier} j - (\omega_{LO} + \omega_{Carrier}).k + \emptyset_{Code_{j-k}} + \emptyset_k \right] \quad \text{Eqn. (13)}$$

The carrier at frequency $\omega_{Carrier}$ is thus phase modulated by the coding sequence $\Phi_{Code}(t)$. As described previously the carrier frequency may typically be of the order of 200 MHz. The chip rate of the code may be in the range of about 20-100 MHz. However the bandwidth of the code may be over the order of several GHz. Thus significant power exists beyond the chip rate.

Looking at the spectral content of this signal term it can be seen that there is a positive frequency carrier modulated by the expected spectrum but also a negative frequency carrier also modulated by the spectrum, i.e.:

$$\cos(\omega_{Carrier} t + \emptyset_{Code}(t)) = \exp(-i(\omega_{Carrier} t + \emptyset_{code}(t)) + \exp(i(\omega_{Carrier} t + \emptyset_{code}(t))) \quad \text{Eqn. (14)}$$

Figure 4:
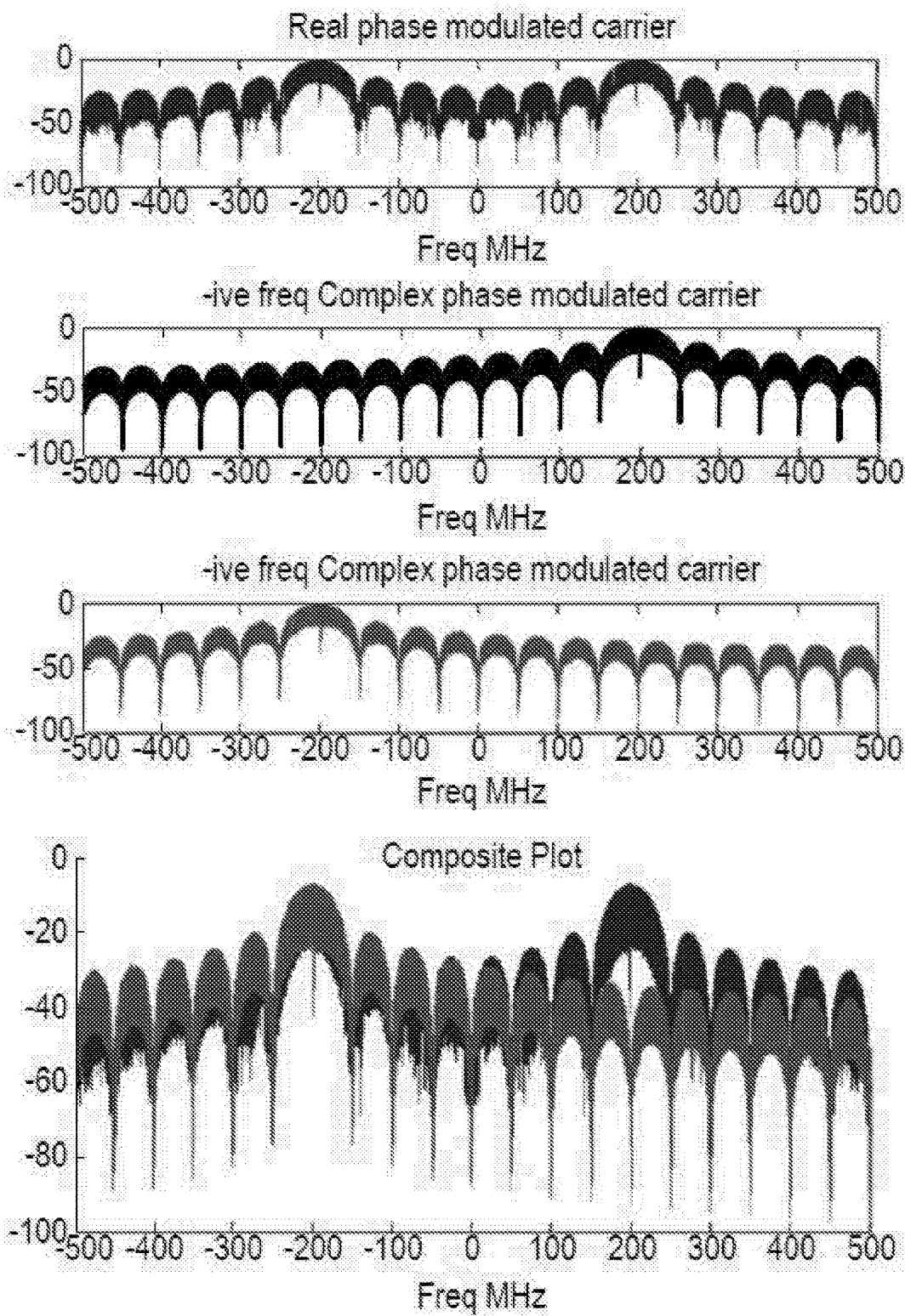
FIG. 4 illustrates the frequency response of system such as illustrated in FIG. 3 with heterodyne detection.

FIG. 4 illustrates, in the top plot, the spectrum of the real phase carrier as may be observed from the detected signal, i.e. the frequency spectrum provided by heterodyne detection. In the plot second from top is illustrated the idealised complex form of the carrier that would ideally be required to correctly demodulate the phase modulation and allow correlation processing. Also shown in the third plot from the top are the isolated negative frequency components that form the unwanted part of the signal generated by heterodyne detection. The bottom plot illustrates overlays the generated signal with the unwanted negative frequency components to demonstrate the impact it has even into the positive frequency regime of the signal. When correlated with the ideal form of the code this has a significant degrading effect on the correlation side-lobe rejection possible.

Figure 5:
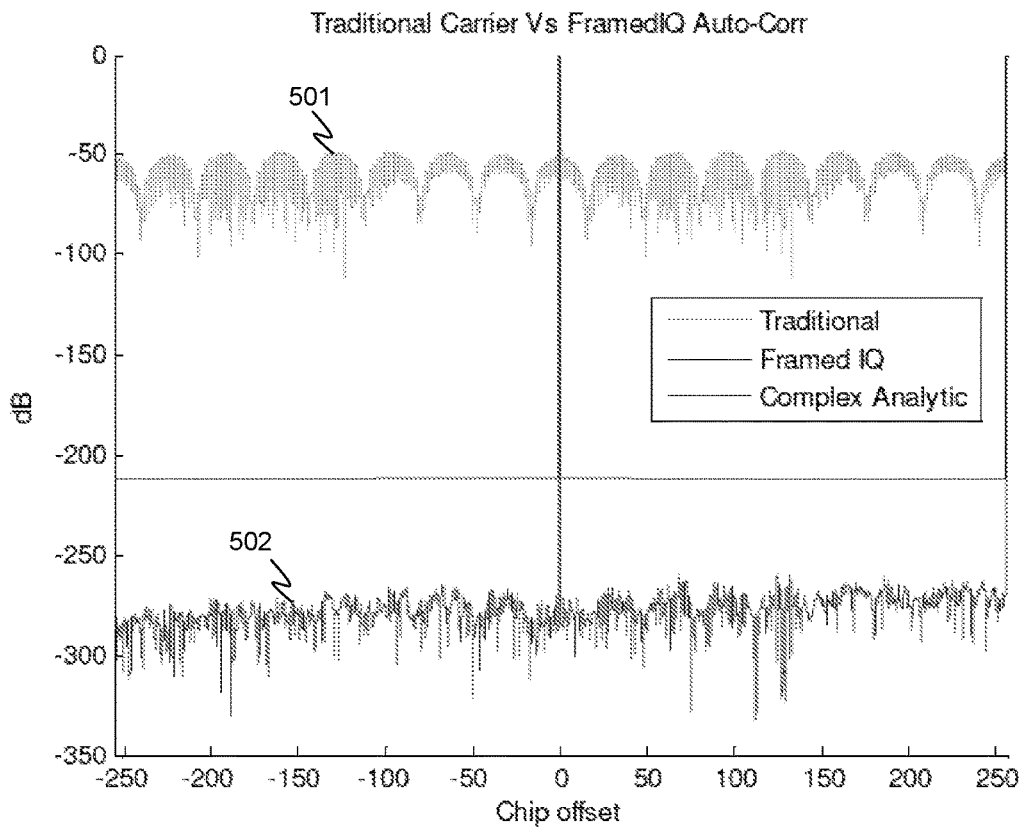
FIG. 5 illustrates a comparison of the autocorrelation response of a signal detected by standard heterodyne techniques and a complex analytic form of the signal.

FIG. 5 illustrates an autocorrelation plot 501 obtained with demodulation using the real signal and also the autocorrelation plot 502 using the idealised complex form of the signal. It can be seen that using a complex analytic form of the signal provides side-lobe rejection of the order of 280 dB, which is not far from the perfect case simulated as discussed above. However the heterodyne mix down of the signal results in a side-lobe rejection of only 50 dB.

One way to address this problem may be to use a carrier frequency which is significantly higher than the chip rate, which would reduce the impact of the overlap of negative frequency components. However the use of a high carrier frequency may impose other limitations of availability of suitable components that would impact on SNR in other ways.

In some embodiments therefore an analytic version of the desired signal, i.e. comprising in-phase (I) and quadrature (Q) components, is formed optically.

This could be done using two local oscillators that maintain a continuous $\pi/2$ phase shift between them, with a separate detector arrangement for each phase. However this would require double the number of detectors and fast ADCs etc. and would significantly add to the cost and complexity of the interrogator unit. This would also require precise control of the phase between the two local oscillator signals.

Instead some embodiments of the present invention ensure that the delay between transmitting a first instance of the first coded sequence and transmitting a second instance of the first coded sequence corresponds to a phase difference of magnitude $\pi/2$ in a signal at the carrier frequency. The signals returned from each of the first and second instances of the first coded sequence can then be processed as I and Q versions of the required signal.

For the first and second instances of the first coded sequence to be treated as I and Q components of the detected signal the time between the first and second instances should be relatively short so that that there is no significant evolution of the signal between interrogations of the fibre with the different coded sequences. As mentioned above the effect of any acoustic stimulus on the fibre on the time scale of a single code is likely to be negligible. The second instance of the first coded sequence of optical radiation may therefore be the very next coded sequence transmitted into the sensing fibre after the first instance of the first coded sequence. In other words the repetition rate between successive transmissions of the first coded sequence may correspond to a phase difference of magnitude $\pi/2$ in a signal at the carrier frequency. This may be achieved by ensuring that the carrier frequency, $\omega_{Carrier}$, is equal to:

$$\omega_{Carrier} = \frac{(2m-1) f_{code}}{4} \quad \text{Eqn. (15)}$$

where $f_{code}$ is the code repetition rate and m is a positive integer. In other words the difference frequency introduced between the launch signal and the local oscillator may be equal to an odd integer multiple of a quarter of the code repetition rate.

In this way at the start of launch of a first instance of the coded optical sequence the carrier signal will be at a first phase angle, say 0. At the start of the launch of the next instance of the coded optical sequence the carrier signal will be at a phase angle of $2\pi(2m-1)/4$, which will be an effective phase difference of $\pm\pi/2$ radians. Thus the carrier signal reflected from any given part of the sensing fibre from the first and second transmissions of the coded optical sequence with exhibit a phase difference of the carrier signal of magnitude $\pi/2$.

Figure 6:
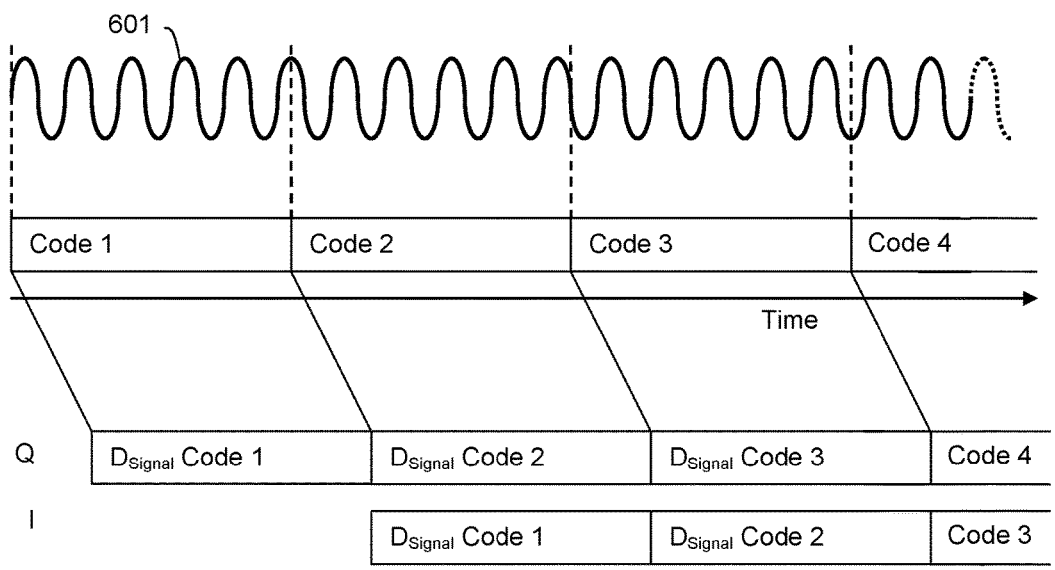
FIG. 6 illustrates one example of a method of deriving a complex analytic form of the backscatter signal.

FIG. 6 illustrates this principle. FIG. 6 illustrates an illustrative signal 601 at the carrier frequency and shows the period during which four successive instances of the first coded sequence, code 1-code 4, are repeated. In this example the coded sequence is repeatedly in a substantially continuous fashion. The time between the start of transmission of code 1 and the start of transmission of code 2, (which in this example is equal to the duration of the coded sequence) is set to be equal to be equal to (x±0.25) cycles of the carrier signal, where x is an integer. It will of course be appreciated that in practice the code repetition rate may be of the order of 20 kHz or so whereas the carrier frequency may be of the order of 200 MHz, however FIG. 6 shows a much reduced ratio of carrier frequency to code repetition rate for clarity.

FIG. 6 also indicates that a backscatter signal received from the fibre when illuminated by the present code, i.e. in response to a second launch of the first coded sequence may be detected and used as one part of the analytic signal (e.g. the quadrature component Q), whilst a version of the signal detected for the previous code (i.e. in response to a first launch) is delayed by one code cycle and used as the other component of the analytic signal, e.g. the In-phase component, The complex analytic signal can be thus be formed as I+iQ as will be well understood by one skilled in the art. It will be appreciated that the signal detected in response to the second coded sequence, code 2, provides the Q component for one period and the I component for another period and thus this approach does not affect the overall sample rate of the DAS sensor. It does however allow an analytic form of the signal to be generated optically without requiring separate LOs and associated detection optics. The generation of the analytic form of the signal means that the performance of the resulting autocorrelation is that of plot 502 illustrated in FIG. 5 rather than 501, providing of the order of a 200 dB gain in side-lobe rejection.

The use of a coded optical sequence which is coded and processed as described above thus provides a number of sensitivity advantages as outline above. It is important however that the coded sequence has good fidelity to the base code.

The code generator 307 is designed to drive the phase modulator 306 with a drive waveform corresponding to the predetermined base code. As mentioned the waveform may comprise a succession of chips of a specific DC value which is held constant to a high tolerance over each chip and which changes value from one chip to the next as quickly as possible.

The code generator may therefore comprise an arbitrary waveform generator such as a DC-coupled DAC. The voltage range of such a DAC may be relatively limited, for example with a voltage range of the order of +0.5V to −0.5V or so, and thus the output of the DAC, a code waveform, may be input to an amplifier stage, such as an RF amplifier to produce the modulator drive waveform the drives the phase modulator.

There are various factors that could contribute to the fidelity of the coded optical sequence. The linearity and frequency response of the code generator 307 and also the linearity of the phase modulator 306. In addition the linearity of the acquisition system may be factor.

In embodiments of the invention a waveform used to generate the coded sequence may be pre-corrected to compensate for inaccuracies in generation of the first coded sequence. The pre-correction may be determined in a code optimisation process.

Figure 7:
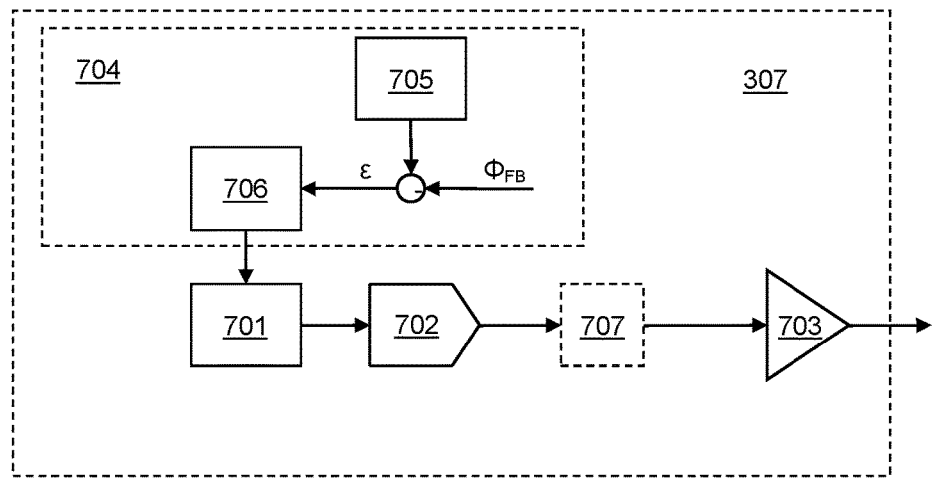
FIG. 7 illustrates one example of a code generator according to an embodiment.

FIG. 7 illustrates one example of an RF code generator 307 according to an embodiment of the invention. A memory 701 stores digital data corresponding to the waveform of the required code which may for instance specify, for each chip, the DC value over the duration of the chip.

In use the data from the memory is supplied to DAC 702 as a digital code signal which operates at a relatively high sample rate, say of the order of 1 GS per second. The code waveform output from the DAC drives the RF amplifier 703 which itself drives the phase modulator 306.

To provide the pre-correction a correction module 704 may modify the values stored in memory 701 to effectively apply a correction for the non-linearities that are experienced in practice in generating the coded optical sequence. This in effect applies a correction to the stored digital code signal. In the example illustrated in FIG. 7 a feedback signal $\Phi_{FB}$ indicative of the phase modulated optical sequence is subtracted from the theoretical code stored in a memory 705 to provide an error c for each chip. An error controller 706, which may for instance comprise a PID controller or other suitable controller, may adjust the stored digital code signal to ensure the transmitted code matches as far as possible the theoretical version.

The use of feedback in this way to correct for the inherent non-linearities that are experienced in practice represents a particular aspects of some embodiments. The combination of feedback to ensure that the coded sequence transmitted has good fidelity to the desired perfect code together with the use of a code with a theoretical autocorrelation property of zero when not in phase provides good system performance.

To provide the feedback signal in some embodiments a version of the launch signal may be tapped, e.g. from before circulator 310 in FIG. 3 and mixed with a version of the LO signal and detected by detector 317. This results in the phase of the transmitted carrier being demodulated and mixed to baseband. The results in a version of the code transmitted but exhibiting any distortions due to non-linearities etc. in the generation. As mentioned the error when compared to the theoretical perfect code can then calculated and fed back to modify the digital code value for each chip. The error controller 706 may control the feedback value for each chip of the code until the error is minimised. This arrangement can't correct for any distortion in the receive path but the majority of the non-linearity is in the RF amplifier and phase modulator itself and thus this correction is sufficient.

One possible limiting factor for code fidelity is the frequency response and slew rate of the DAC and amplifier chain. RF amplifiers are available with bandwidths into the 10-40 GHz range, which will typically exceed the bandwidth of the phase modulator. However typical DACs may have output bandwidths of a maximum of about 1-2 GHz. As mentioned above the bandwidth of the ideal code may be of the order of several GHz and thus the DAC could potentially limit the bandwidth and fidelity of the coded optical sequence.

Therefore in some embodiments an edge enhancer 707 may be located between the DAC 702 and amplifier 703 to reduce the transition time between signal levels in the code waveform, i.e. the signal output of the DAC. The edge enhancer may comprise a track-and-hold circuit. The track-and-hold circuit is operable in a track mode and also a hold mode and can swap between modes quickly. In the track mode the circuit output tracks the input signal, which is the output of the DAC, so that then current input to the track-and-hold circuit 707 appears at its output. In the hold mode the circuit maintains the DC value at the output so that the output no longer varies with the input signal.

The track-and-hold circuit is clocked with a slight delay to the DAC such that when the DAC output changes from one chip to the next the track-and-hold circuit 707 is in hold mode maintaining the value from the previous chip. Only when the DAC output has stabilised at the new value for the new chip does the track-and-hold circuit return to track mode so that the new DAC output value is passed to the RF amplifier. The switch back to track mode, and output of the new DAC value, can occur rapidly, for example with a track-hold settling time of the order of 100 ps or so, which achieves the bandwidth requirements.

Figure 8:
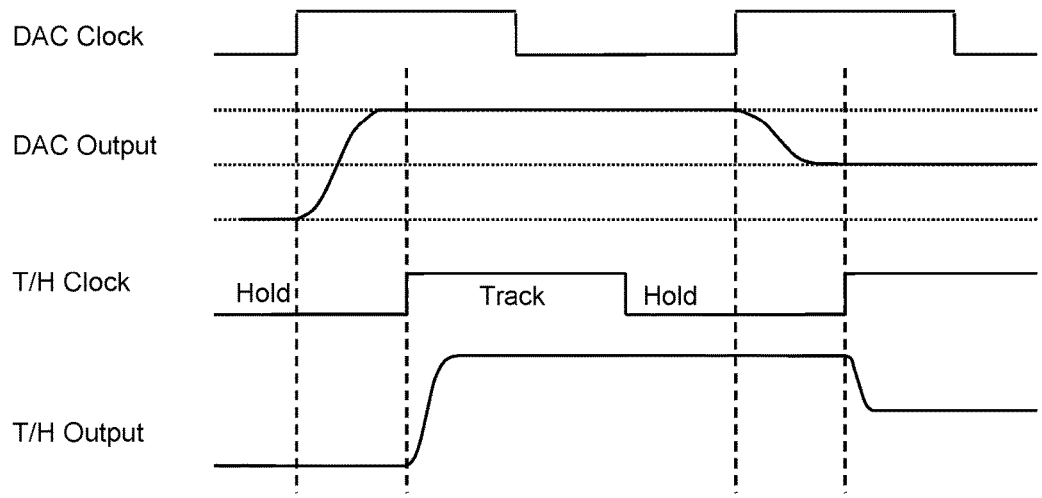
FIG. 8 illustrates an example output of the code generator of FIG. 7.

FIG. 8 illustrates the operation of the track-and-hold circuit. FIG. 8 illustrates the DAC clock and the output of the DAC. The DAC value changes at the rising clock edge. In the thus example the output changes from the minimum output value to the maximum output value and then, in the next clock cycle to a mid-level value. The DAC output has a certain settling time however. The track-and-hold circuit is clocked by a version of the DAC clock which is delayed by a fraction of a clock cycle, where the delay is longer than the DAC settling time. In this example the track-and-hold circuit is in hold mode for half the clock cycle (which overlaps with the change in DAC state) and in track mode for the other half of the clock cycle. It can thus be seen that at the time the DAC output changes the track-and-hold circuit is in hold mode and thus maintains the previous value. Later the delayed T/H clock switches the track-and-hold circuit to track mode and thus the input again starts to pass to the output, with a much quicker settling time than the DAC. The track-and-hold circuit then swaps back to hold mode before the next DAC transition. The resultant output is a slightly delayed version of the waveform output from the DAC but with much quicker transitions.

This higher bandwidth copy of the polylevel waveform generated by the DAC is then amplified, for example to a full range of around ±5.0V to drive the phase modulator. The amplification should maintain the analogue bandwidth of at least 10 GHz or so and may preferable be DC coupled. The amplifier may preferably be chosen to have a SFDR of the order of better than 70 dB.

It should be noted however that since the system operates in a quasi-steady state with the digital signal provided to the DAC being repeated on a loop, it would be possible to AC couple the amplifier stage and distort the digital signal to servo the non-linearity and AC response. This would however limit the dynamic range of the DAC reducing its effective number of bits and thus the amplifier stage may have to have a higher gain to achieve the driving amplitude necessary for the phase modulator.

Embodiments of the invention thus provide for distributed fibre optic sensor apparatus and methods that provide high sensitivity. The sensing fibre is repeatedly interrogated with instances of a first coded sequence of optical radiation and the backscatter signal detected is correlated with the known coded sequence. This provides location determination along the length of the sensing fibre that is independent of the length of the first coded sequence. Thus relatively long coded sequences may be used to provide a high sensing duty cycle and in some embodiments the fibre may be interrogated in use with continuous wave radiation. The coded optical sequence transmitted may be encoded, e.g. in phase, according to a polylevel code and may in particular be a Frank code. Such a code provides good autocorrelation properties and allows coded OTDR approaches to be applied to fibre optic distributed sensing.

The embodiments described herein describe methods and apparatus for producing a polylevel code, such as a polyphase coded sequence, that has good enough fidelity to the base code to provide the good autocorrelation properties in a practical system, for instance by pre-correcting a waveform used to generate the code. Embodiments described herein also provide an analytic form of the backscatter optically so as to avoid the problem of mixing of unwanted signal components reducing signal to noise.

Such a distributed fibre optic sensor may be used in a range of applications. The sensor may be sensitive to any dynamic disturbances acting on the sensing portion that result in an effect change in optical path length. The sensor may be used in particular to detect dynamic strains such as generated by disturbances on the sensor, i.e. due to vibrations, incident acoustic waves or seismic waves or other pressure or strain waves. The sensor apparatus may therefore be used for a fibre optic distributed acoustic sensing (DAS). The term acoustic shall encompass sensing of any type of pressure or propagating mechanical disturbances and shall in particular include sensing of seismic signals.

Optical path length changes may also be induced by temperature changes and in some embodiments the apparatus may be used to detect dynamic temperature variations acting on the sensing fibre. In some embodiments the sensing fibre may be coated with a material that responds to some other environmental condition to induce a dynamic strain in the fibre. For instance the principles of conventional DAS have been applied to magnetic sensing or detection of ionising radiation and similar sensors could be implemented using sensor apparatus according to the present embodiments.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A distributed fibre optic sensor apparatus comprising:
   an optical generator configured to repeatedly generate a first coded sequence of optical radiation to be launched, in use, into a sensing optical fibre, the first coded sequence being encoded according to a polylevel coding sequence wherein the optical generator comprises a code generator including a code optimisation module for comparing a feedback signal derived from the first coded sequence of optical radiation before transmission with a reference version based on the polylevel coding sequence and deriving a pre-correction to be applied to the digital code signal;
   a detector configured to detect optical radiation which has been Rayleigh backscattered from within the sensing optical fibre; and
   a processor configured to process the output of the detector, wherein said processing comprises, for at least one range bin, correlating a detection signal derived from the detector output with the polylevel coding sequence at a time delay corresponding to that range bin.

2. A distributed fibre optic sensor apparatus as claimed in claim 1 wherein the first coded sequence of optical radiation comprises a sequence of chip periods and an optical property of the optical radiation is modulated according to an encoding value of the polylevel coding sequence which is constant over a chip period.

3. A distributed fibre optic sensor apparatus as claimed in claim 2 wherein the polylevel coding sequence has a mathematic autocorrelation function which is non-zero when the correlation is in phase and a value of zero when delayed by an amount equal to a multiple of the chip period.

4. A distributed fibre optic sensor apparatus as claimed in claim 1 wherein the polylevel coding sequence is based on a Frank code.

5. A distributed fibre optic sensor apparatus as claimed in claim 1 wherein the polylevel coding sequence is based on a plurality of complementary codes.

6. A distributed fibre optic sensor apparatus as claimed in claim 1 wherein the polylevel coding sequence comprises a sequence of encoding values, the sequence being of length $P^{<2>}$, wherein the Mth encoding value of the sequence is equal to:

k.i.j modulo P;

where M=i+(jxP); i and j can each take any values between and including 0 and (P−1) and k is a constant.

7. A distributed fibre optic sensor apparatus as claimed in claim 6 wherein the value of k is equal to $2\pi/P$.

8. A distributed fibre optic sensor apparatus as claimed in claim 1 wherein the optical generator is configured to modulate the phase of the first coded sequence of optical radiation according to the polylevel coding sequence.

9. A distributed fibre optic sensor apparatus as claimed in claim 1 wherein the optical generator comprises;
an optical source for generating a continuous wave optical signal; and
a first modulator for modulating the continuous wave optical signal based on the polylevel coding sequence to generate the first coded sequence of optical radiation.

10. A distributed fibre optic sensor apparatus as claimed in claim 9 wherein the first modulator comprises a phase modulator.

11. A distributed fibre optic sensor apparatus as claimed in claim 9 wherein the code generator drives the modulator with a drive signal, wherein the value of the drive signal is modulated based on the polylevel coding sequence.

12. A distributed fibre optic sensor apparatus as claimed in claim 11 wherein the code generator is configured to generate the drive signal based on a digital code signal.

13. A distributed fibre optic sensor apparatus as claimed in claim 12 wherein the code generator comprises a digital to analogue converter (DAC) for receiving the digital code signal and generating a code waveform and amplifier downstream in a signal path from the DAC for producing the drive signal.

14. A distributed fibre optic sensor apparatus as claimed in claim 13 comprising an edge enhancer located in the signal path between the DAC and the amplifier, the edge enhancer being configured to reduce a transition time between signal levels in the code waveform.

15. A distributed fibre optic sensor apparatus as claimed in claim 14 wherein the edge enhancer comprises a track-and-hold circuit configured to operate in a hold mode during a period when the DAC transitions from outputting a first signal level for the code waveform to a second signal level, wherein in the hold mode the track-and-hold circuit will hold its output at a first signal level as the code waveform output and subsequently to operate in a track mode to track the second signal level.

16. A distributed fibre optic sensor apparatus as claimed in claim 9 wherein the optical generator comprises a splitter for splitting the continuous wave optical signal generated by the optical source into both a launch signal in a launch path which includes said first modulator and a local oscillator signal in a local oscillator path and wherein the apparatus comprises a mixer for mixing optical radiation which is backscattered from the sensing fibre with the local oscillator signal prior to being detected by said detector.

17. A distributed fibre optic sensor apparatus as claimed in claim 16 further comprising a second modulator for introducing a frequency difference between the launch signal and the local oscillator signal.

18. A distributed fibre optic sensor apparatus as claimed in claim 17 wherein the second modulator comprises an acousto-optic modulator in the launch path.

19. A distributed fibre optic sensor apparatus as claimed in claim 17 wherein the optical generator is configured to generate repeated instances of the first coded sequence at a code repetition rate and the frequency difference between launch signal and the local oscillator signal is equal to an odd integer multiple of a quarter of the code repetition rate.

20. A distributed fibre optic sensor apparatus as claimed in claim 19 wherein the processor is configured to, for at least one range bin, take a first backscatter signal detected in response to a first launch of the first coded sequence of optical radiation and a second backscatter signal detected in response to a second launch of the first coded sequence of optical radiation and process said first and second backscatter signals as in-phase and quadrature components to provide a demodulated backscatter signal as the detection signal.

21. A distributed fibre optic sensor apparatus as claimed in claim 16 wherein the local oscillator path and the launch path between the optical source and the first modulator comprises components that maintain polarisation state.

22. A distributed fibre optic sensor apparatus as claimed in claim 21 comprising a polarising beam splitter for splitting optical radiation which is backscattered from the sensing fibre into first and second orthogonal polarisation states and a polarising beam splitter for splitting the local oscillator signal into the first and second orthogonal polarisation states and the mixer is configured such that, for each of the first and second polarisation states, optical radiation backscattered from the sensing fibre is mixed with the local oscillator signal of the corresponding polarisation state prior to being detected separately by said detector.

23. A distributed fibre optic sensor apparatus as claimed in claim 16 wherein the mixer is configured to mix optical radiation which is backscattered from the sensing fibre separately with first and second local oscillator signals to produce respective first and second mixed signals, wherein the first and second local oscillator signals have a phase difference of $\pi$ radians from one another, and wherein the detector is configured to the detect the first and second mixed signals separately and subtract the detector outputs to the first and second mixed signals from one another to provide the detection signal.

24. A distributed fibre optic sensor apparatus as claimed in claim 16 comprising a code optimisation detector configured to receive a version of the first coded sequence of optical radiation before transmission mixed with the local oscillator signal wherein the optical generator comprises a code generator for driving the modulator with a drive signal, wherein the value of the drive signal is modulated based on the polylevel coding sequence, and wherein the code generator comprises a code optimisation module for comparing a feedback signal derived from the first coded sequence of optical radiation before transmission with a reference version based on the polylevel coding sequence and deriving a pre-correction to be applied to the digital code signal and the code generator is configured to generate the drive signal based on a digital code signal.

25. A distributed fibre optic sensor apparatus as claimed in claim 1 wherein the processor is configured to, for each of a plurality of different rage bins, derive a detection signal from the detector output and correlate the detection signal with the polylevel coding sequence at a time delay corresponding to that range bin.

26. A distributed fibre optic sensor apparatus as claimed in claim 25 wherein, based on said correlation, the processor is configured to generate an absolute phase value for each of said range bins in response to each launch of the first coded sequence of optical radiation.

27. A distributed fibre optic sensor apparatus as claimed in claim 26 wherein the processor is configured to differentiate the phase values for each of a plurality of longitudinal sensing portions of the sensing fibre to provide an indication of the change of phase for such sensing portions.

28. A distributed fibre optic sensor apparatus as claimed in claim 1 further comprising a first length of optical fibre configured as said sensing optical fibre.

29. A distributed fibre optic sensor apparatus as claimed in claim 28 wherein said sensing fibre is deployed along at least one borehole.

30. A seismic sensing apparatus comprising:
a distributed fibre optic sensor apparatus as claimed in claim 1 being coupled to a sensing optical fibre deployed in an area of interest; and
wherein the processor is configured to process the output of the detector to provide a measurement signal from each of a plurality of sensing portions of the sensing fibre indicative of seismic signals incident at said sensing portion.

31. A seismic sensing apparatus as claimed in claim 30 wherein the processor is configured to correlate the measurement signal with a seismic stimulus applied to the area of interest.

32. A method of distributed fibre optic sensing comprising:
repeatedly launching a first coded sequence of optical radiation into a sensing optical fibre with an optical generator, the first coded sequence being encoded according to a polylevel coding wherein an optical generator includes a code generator having a code optimisation module that compares a feedback signal derived from the first coded sequence of optical radiation before transmission with a reference version based on the polylevel coding sequence and deriving a pre-correction to be applied to the digital code signal;
detecting optical radiation which has been Rayleigh backscattered from within the sensing optical fibre; and
processing the output of the detector, wherein said processing comprises, for at least one range bin, correlating a detection signal derived from the detector output with the polylevel coding sequence at a time delay corresponding to that range bin.

* * * * *